Patented Mar. 7, 1950

2,500,120

UNITED STATES PATENT OFFICE 2,500,120

HARD FILM CORROSION PREVENTIVE

Hulon L. Crawford, Houston, Tex., assignor, by mesne assignments, to Standard Oil Development Company, Elizabeth, N. J., a corporation of Delaware No Drawing. Application March 19, 1948, Serial No. 15,961

2 Claims. (Cl. 106—268)

This invention relates to the production of a fluid composition adapted to form a hard corrosion preventing film when applied to metallic surfaces exposed to corrosive fluids for the protection of said surfaces from corrosion.

My composition consists of a mixture of Gilsonite, petrolatum, a plasticizer, lead stearate, and a petroleum hydrocarbon solvent. As a plasticizer I prefer to employ amyl naphthalene inasmuch as this material exhibits the desired plastic properties to my composition. Of course, any one of the homologous series or a mixture thereof may be employed.

In preparing the composition I prefer to use the aforementioned ingredients in about the following proportions, that is, 178 lbs. of Gilsonite, 200 lbs. of petrolatum having a melting point of about 153° F., 83 lbs. of lead stearate, 39 lbs. of amyl naphthalene, and 500 lbs. of a petroleum distillate boiling between about 320° F. and 400° F. Good results mays be obtained, however, when the ingredients are varied within the following limits: Gilsonite, 150 to 200 lbs.; petrolatum, 150 lbs. to 250 lbs.; lead stearate, 60 lbs. to 100 lbs.; amyl naphthalene, 20 lbs. to 50 lbs.; petroleum distillate boiling between about 320° F. and 400° F., 450 to 550 lbs.

The petrolatum employed in the composition may vary in melting point from about 148° F. to about 160° F. though I prefer to employ petrolatum having a melting point between about 150° F. and 154° F.

The lead stearate employed should be in the form of a finely divided powder and preferably should be precipitated lead stearate.

In preparing the composition of my invention the Gilsonite and petrolatum are mixed and heated in a vessel to a temperature of approximately 450° F. at which temperature the powdered lead stearate is incorporated in the mixture. After the lead stearate has been admixed with the Gilsonite and petrolatum, the temperature of the mixture is maintained at about 450° for about 15 minutes. Amyl naphthalene is then added to the aforedescribed mixture, and after it has become thoroughly dispersed by mixing, the hydrocarbon solvent is incorporated into the mixture by means of an agitator. The hydrocarbon solvent, when added to the mixture, is at approximately atmospheric temperature and consequently the final solvent containing mixture is at a temperature in the vicinity of 250° F. This final mixture is then rapidly cooled to atmospheric temperature immediately after the incorporation of the hydrocarbon solvent. This chilling operation may be accomplished by any suitable means such, for example, as by passing the mixture through a heat exchanger.

My composition is fluid at ordinary temperatures and may be applied to metallic surfaces by any well known means such as by the use of a brush, a spray gun, a mop, etc. After my composition has been applied to a metallic surface, the hydrocarbon solvent quickly evaporates therefrom leaving a hard, tough film on the surface which protects it from corrosion when exposed to the atmosphere or to other corrosive media such as salt water, for example. Furthermore, the resulting hard coating may be removed from the metallic surface, when desired, by means of an ordinary hydrocarbon solvent such as naphtha or kerosene. Ordinarily one coating of the composition of my invention will be sufficient to protect a metallic surface from corrosion although in some cases it may be desirable to apply several coatings. Not only is my composition adapted to be used for the protection of ferrous metal surfaces but it may also be used to protect surfaces composed of other metals, such as copper or aluminum.

I claim:

1. A fluid composition adapted to form a hard, corrosion-preventing film on metallic surfaces consisting essentially of 150 to 200 pounds of Gilsonite, 150 to 250 pounds of petrolatum having a melting point between 148° F. and 160° F., 60 to 100 pounds of lead stearate, 20 to 50 pounds of amyl naphthalene, and 450 to 550 pounds of petroleum distillate boiling in the range of 320° F. and 400° F.

2. A fluid composition adapted to form a hard, corrosion-preventing film on metallic surfaces consisting of 178 pounds of Gilsonite, 200 pounds of petrolatum having a melting point of 153° F., 83 pounds of lead stearate, 39 pounds of amyl naphthalene, and 500 pounds of petroleum distillate boiling within the range of 320° to 450° F.

HULON L. CRAWFORD.

REFERENCES CITED

The following references are of record in the file of this patent:

UNITED STATES PATENTS

| Number | Name | Date |
|---|---|---|
| 2,137,147 | Styles | Nov. 15, 1938 |

FOREIGN PATENTS

| Number | Country | Date |
|---|---|---|
| 310,640 | Great Britain | May 2, 1929 |
| 397,267 | Great Britain | Aug. 24, 1933 |
| 861,252 | France | Oct. 22, 1940 |